Oct. 30, 1934.     H. Z. COBB     1,978,985

METHOD OF MAKING FLASHLESS MOLDED ARTICLES

Filed Sept. 11, 1930

INVENTOR
Henry Z. Cobb
BY
ATTORNEY

Patented Oct. 30, 1934

1,978,985

UNITED STATES PATENT OFFICE 1,978,985

METHOD OF MAKING FLASHLESS MOLDED ARTICLES

Henry Z. Cobb, Providence, R. I., assignor to Revere Rubber Company, Providence, R. I., a corporation of Rhode Island Application September 11, 1930, Serial No. 481,102

6 Claims. (Cl. 18—55)

My present invention relates to an improved method of producing flashless molded articles.

In the production of articles from moldable material, such as rubber or rubber-like compounds, a flash or fin is invariably formed in the article at the joining points of the elements of the mold. This flash or fin, after the the article is completed, must be removed and the portion of the article occupied by the flash must be polished. These extra operations add greatly to the expense of manufacturing moldable articles and also produces an article that while fully as strong as an article produced in any other way yet lacks the fineness of finish that is so desirable in articles of this character. The production of a fin or flash on the steering wheel of an automobile or other motor driven vehicle is particularly undesirable because of the fact that no matter how carefully the article may be refinished a roughness is always apparent at the point where the flash was formed.

In my present invention, I have obviated the production of a flash in molded articles and by my invention am enabled top roduce a flashless steering wheel with an initial high polish, the polish being obtained simultaneously with the production of the article in the mold.

The principal object of my invention, therefore, is an improved method of making a flashless molded article.

Another object of my invention is an improved mold for producing a flashless molded article.

In the accompanying drawing illustrating a mold embodying my invention and by means of which my improved method may be practiced:

Figure 3:
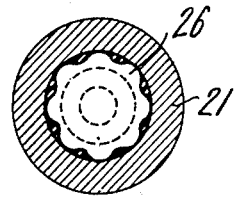
Fig. 3 is a plan view on the line 3—3 of Fig. 1.

In the drawing, 10 designates the bed plate of a hydraulic press and 11 the movable platen which is moved in the usual manner toward and from the bed plate 10 to firmly hold a mold in position therebetween. Such mold consists essentially of the usual base 12 and a top portion 13. These members have a mold cavity 14 formed in their contacting surfaces, such mold cavity being of any usual or desired form. The bottom plate 12 rests on a steam plate 15 provided with a plurality of perforations 16 through which steam or hot air flows to heat the steam plate and impart such heat to the bottom plate 12. Resting on top of the top plate 13 is a second steam plate 17 provided also with perforations 18 through which steam or hot air may pass and between the steam plate 17 and the top plate 13 is arranged a copper or other gasket 19. In the particular type of mold employed the upper central portion is provided with a passage 20 communicating with the mold cavity 14 and in alignment with the bore of a central member 21 seated in a centrally arranged orifice in the upper steam plate 17. The lower plate 12 of the mold is provided with a centrally arranged hub 22 and with a centrally arranged perforation in which is seated a taper plug 23. The hub 22 forms a seat for the central hub portion 24 of the article to be molded and the taper plug 23 passes through a perforation formed in the hub 24 and, therefore, positively locates the hub 24 and the framework 25 of the article to be molded within the confines of the mold cavity 14. The taper plug 23 has formed thereon at its upper end a collar 23a which fits into a recess in the hub 24 of the article to be molded. On the upper end of the collar 23a is formed a member 26, the edge of which is serrated as shown in Fig. 3 and which allows the passage of moldable material from the cylinder 21 into the mold cavity 14 through the passage 20. Slidably mounted within the cylinder 21 is a piston 27 attached to the lower end of a piston rod 28 which is slidably mounted in a hydraulic cylinder 29.

In order to impart a smooth finish to the article to be molded, I find it preferable to highly polish the mold cavity 14 and then to chromium plate such mold cavity. I find that articles of moldable material formed within the mold cavity 14 and subjected to heat and pressure are given en extremely high finish.

Figure 1:
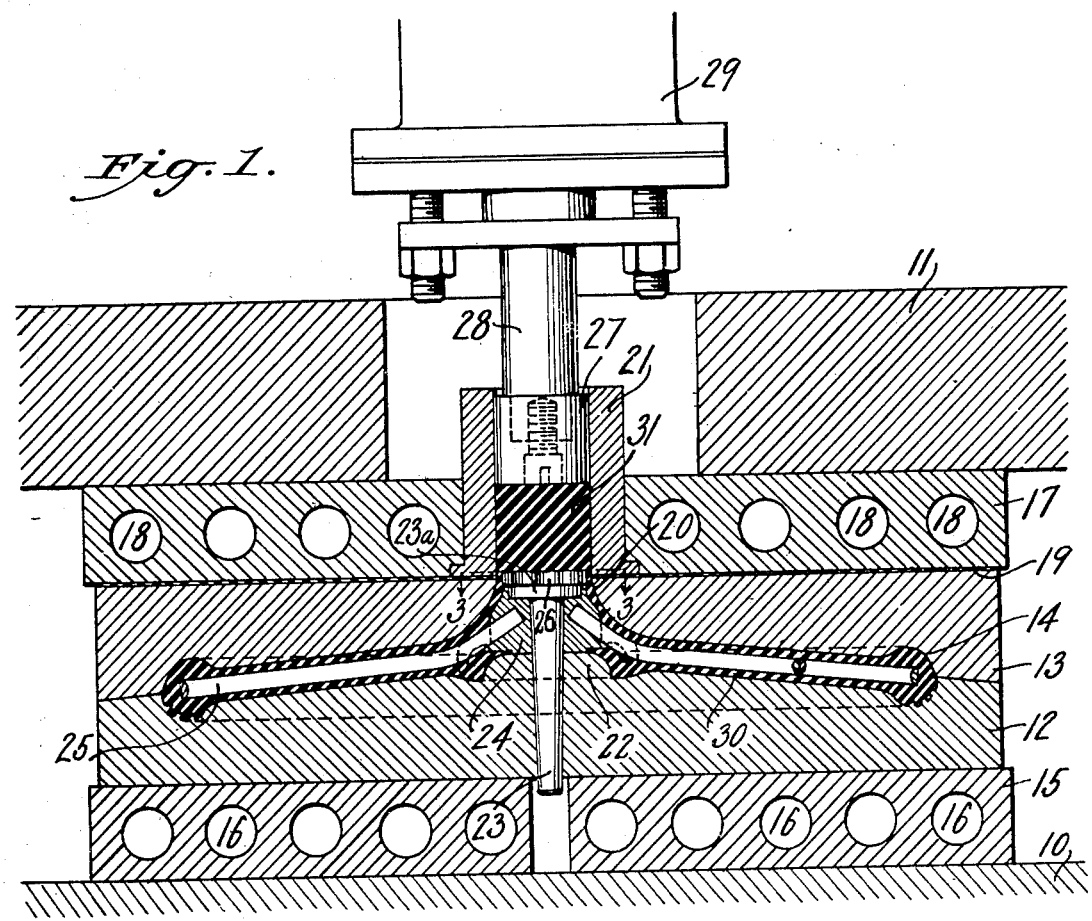
Figure 1 is a central sectional elevation.
Figure 2:
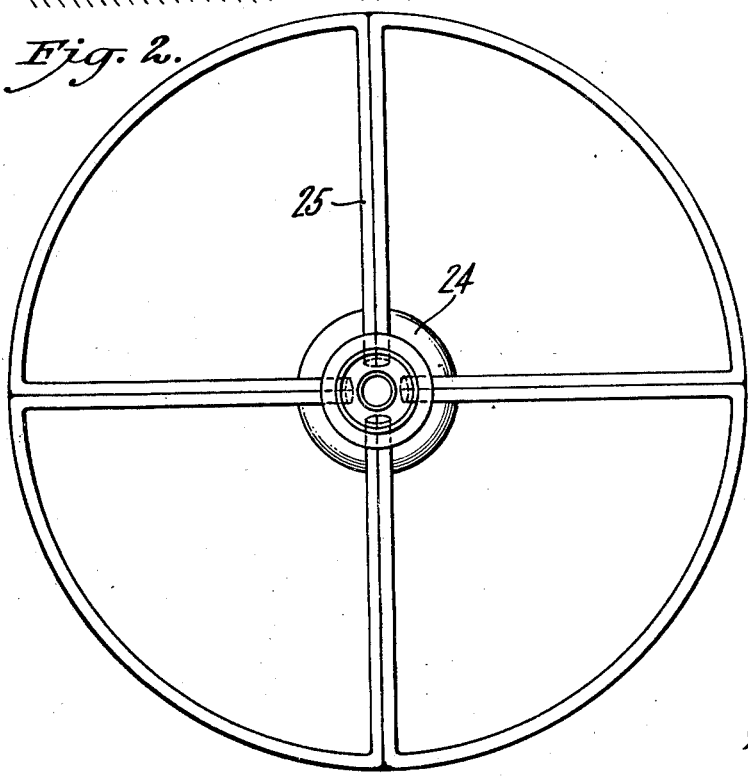
Fig. 2 is a plan of the steering wheel framework before the application thereto of any moldable material.

In practicing my improved method and considering the method as applied to the manufacture of steering wheels for automobiles or other power driven vehicles I preform thereon a moldable covering 30 such for example as moldable rubber and such preformed article is made slightly less in size than the size of the mold cavity 14. The undersized molded article is then placed within the mold cavity 14 after weighing, the weighing being necessary to determine the amount of moldable material to be added in order to fill the mold cavity 14 and bring the molded article to full size. After being placed within the mold cavity 14, the taper plug 23 is placed in position as shown in Fig. 1, and as much moldable material 31 is placed in the cylinder 21 as is necessary to be added to the molded article within the mold cavity 14 to bring the same to full size as determined by the size of the mold cavity. The mold members 12 and 13 are brought firmly together as shown in Fig. 1, and by means of steam or hot air passed through the perforations 16 and 18, the undersized molded article within the mold cavity 14 is heated for a length of time sufficient to soften the covering 30 of moldable material on the framework 25 and on the hub 24. When this occurs, the piston 27 is forced downward in the cylinder 21 by means of the pressure within the hydraulic cylinder, and the moldable material 31 is forced past the serrations in the member 26 and into the mold cavity 14 through the passage 20. During all this time, the article within the mold cavity 14 is being subjected to heat and pressure and the article is subjected to heat a sufficient length of time to thoroughly vulcanize and harden the moldable material upon the framework 25 and also the pressure on such moldable material is maintained through the piston 27.

There results, therefore, a molded article on which there is no flashing and which has an extremely smooth and high finish.

Having thus described my invention what I claim and desire to protect by Letters Patent is:

1. The improved method of producing a flashless molded article, which consists in preforming the article undersize, placing the same in a closed mold, rendering at least a portion thereof plastic, and forcing enough moldable material into the mold by pressure to merge with and bring the article to the desired size.

2. The improved method of producing a flashless molded article, which consists in preforming the article undersize, placing the same in a closed mold, softening the undersized preformed article, and forcing enough moldable material into the mold by pressure to bring the article to size as determined by the mold.

3. The improved method of producing a flashless molded article having a relatively high finish, which consists in preforming the article of moldable material and undersize, placing the same in a closed mold, softening the undersized preformed article, forcing enough moldable material into the mold to bring the article to size as determined by the mold, and vulcanizing by heat.

4. The improved method of producing a flashless molded article having a relatively smooth and high finish, which consists in preforming the article undersized and of moldable material, placing the same in a closed mold, softening the undersized preformed article by the application of heat, forcing by pressure enough additional moldable material into the mold to bring the article to size as determined by the size of the mold, and vulcanizing the article by heat, while maintaining the same under pressure.

5. The improved method of producing a flashless molded steering wheel having a relatively smooth and high finish which comprises the steps of covering a wheel frame with moldable material but undersized, placing the same in a closed mold, softening the moldable material by the application of heat, forcing by pressure enough additional moldable material into the mold to bring the wheel to size as determined by the size of the mold, and causing the permanent setting of the moldable material while maintaining the same under pressure.

6. The improved method of producing a flashless molded steering wheel having a relatively smooth and high finish which comprises the steps of covering a wheel frame with unvulcanized rubber material but undersized, placing the same in a closed mold, softening the rubber material by the application of heat, forcing by pressure enough additional rubber material into the mold to completely fill the mold about the wheel frame to bring the wheel to size, and vulcanizing the rubber material by heat while maintaining it under pressure.

HENRY Z. COBB.